United States Patent [19]
Lai

[11] Patent Number: 5,570,760
[45] Date of Patent: Nov. 5, 1996

[54] HUB BRAKE FOR BICYCLES

[75] Inventor: I-Tai Lai, Feng-Yuan, Taiwan

[73] Assignee: Valisum Industries Ltd., Taichung Hsien, Taiwan

[21] Appl. No.: 585,937

[22] Filed: Jan. 16, 1996

[51] Int. Cl.[6] ........................................... B62L 3/02
[52] U.S. Cl. ........................................... 188/26; 188/24.22
[58] Field of Search ............................. 188/24.11, 24.17, 188/26, 24.22; 192/6 R; 74/594.1

[56] References Cited

U.S. PATENT DOCUMENTS

| | | | |
|---|---|---|---|
| 2,154,188 | 4/1939 | Warrington | 188/26 |
| 2,177,913 | 10/1939 | Srogi | 188/26 |
| 2,552,484 | 5/1951 | Hood | 188/26 |
| 2,572,182 | 10/1951 | Mueller | 188/26 |
| 4,179,013 | 12/1979 | Kine | 188/26 |
| 4,226,310 | 10/1980 | Ozaki | 188/26 |
| 4,355,706 | 10/1982 | Pan | 192/6 R |
| 5,027,930 | 7/1991 | Reed | 188/24.17 |

*Primary Examiner*—Robert J. Oberleitner
*Assistant Examiner*—Chris Schwartz
*Attorney, Agent, or Firm*—Alfred Lei

[57] ABSTRACT

A hub brake for bicycles including a cylindrical hub in which is fitted a screw rod extending therethrough, a driving device including a driving screw, a bearing, an adjusting nut, a bearing and an arm, a recovering device including a torsion spring, a helical spring and a nut, and a braking device including a brake block and a positioning plate, and a cover fixedly mounted on the positioning plate, whereby the hub brake for bicycles can effectively reduce speed or stopping motion of a bicycle.

1 Claim, 6 Drawing Sheets

5,570,760

HUB BRAKE FOR BICYCLES

BACKGROUND OF THE INVENTION

1. Field of the Invention

This invention relates to an improved hub brake for bicycles.

2. Description of the Prior Art

FIG. 6 illustrates the structure of a prior art hub brake for bicycles. As shown, the hub brake utilizes a arm 52 to rotate a rectangular block 53 to drive a pair of brake shoes 51 thereby expanding a pair of brake shoes 51 to contact the inner surface of the hub and therefore reducing speed or stopping motion of a bicycle. Further, two springs 54 are provided for returning the brake shoes 51 to their original positions when the brake is released.

However, such a hub brake suffers from the following drawbacks:

1. The contact area between the brake shoes 51 and the inner surface of the hub is small thereby making it impossible to apply the brake effectively.
2. Once the brake shoes are worn out and the rectangular block 53 is not adjusted in time, brake failure will easily occur.

Therefore, it is an object of the present invention to provide an improved hub brake which can obviate and mitigate the above-mentioned drawbacks.

SUMMARY OF THE INVENTION

This invention relates to an improved hub brake for bicycles.

It is the primary object of the present invention to provide a hub brake for bicycles which can effectively reduce the speed or stopping motion of a bicycle.

It is another object of the present invention to provide a hub brake for bicycles which can safely keep the rider from danger.

It is still another object of the present invention to provide a hub brake for bicycles which can be rapidly actuated.

It is still another object of the present invention to provide a hub brake for bicycles which is durable in use.

It is a further object of the present invention to provide a hub brake for bicycles which is easy to assemble.

Other objects of the invention will in part be obvious and in part hereinafter pointed out.

DETAILED DESCRIPTION OF THE PREFERRED EMBODIMENT

Figure 1:
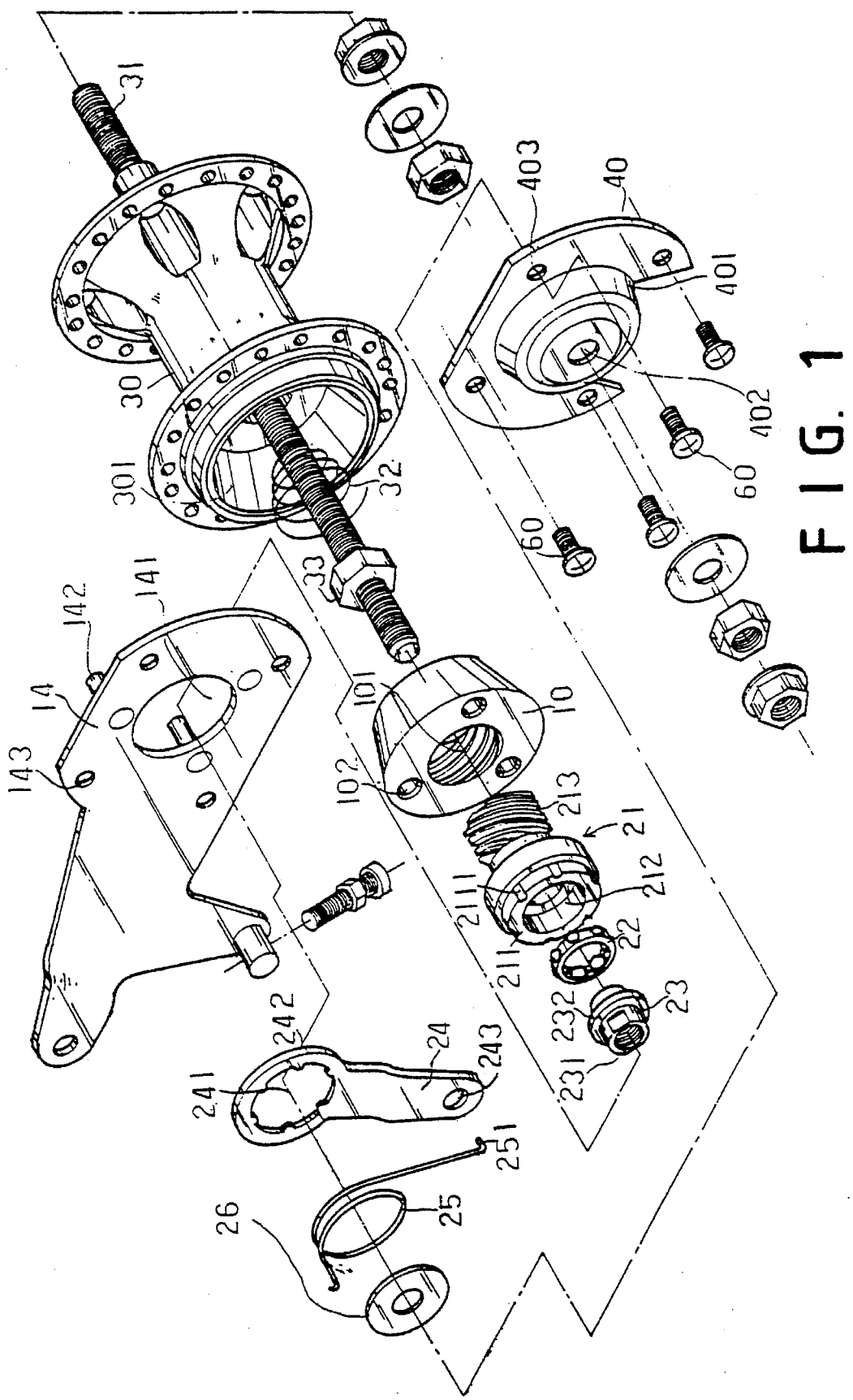
FIG. 1 is an exploded view of the present invention.

For the purpose of promoting an understanding of the principles of the invention, reference will now be made to the embodiment illustrated in the drawings. Specific language will be used to describe the same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
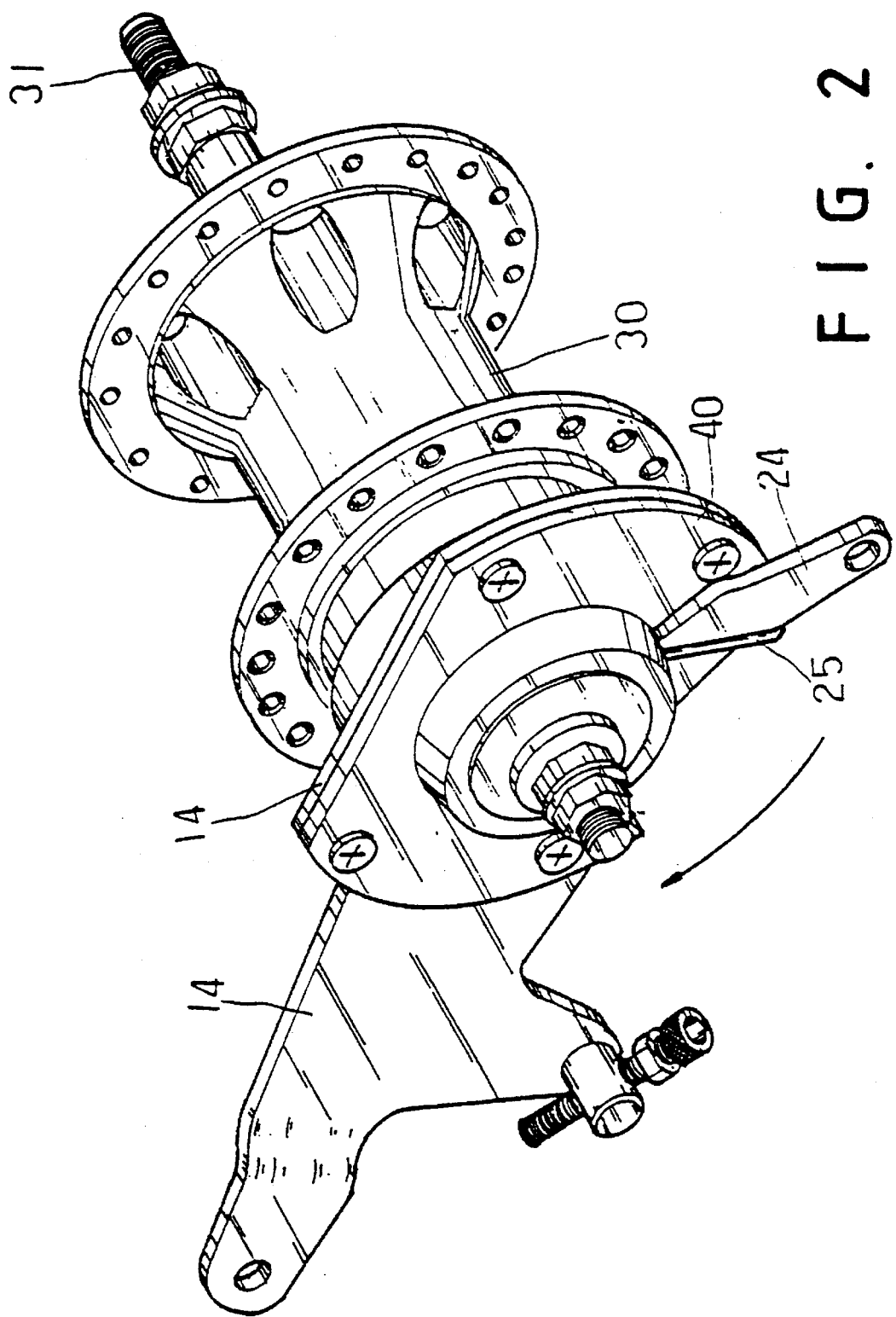
FIG. 2 is a perspective view of the present invention.
Figure 3:
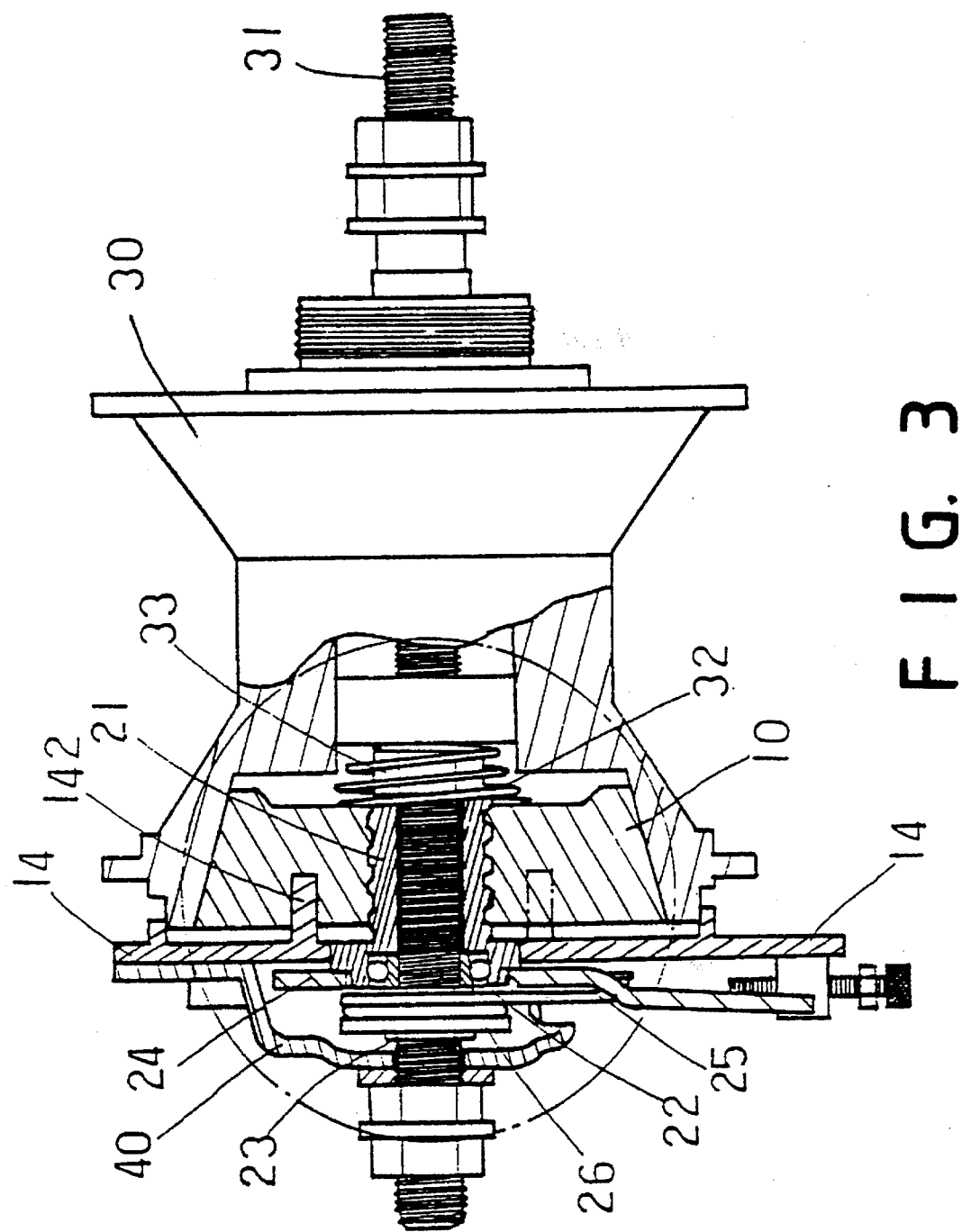
FIG. 3 is a sectional view of the present invention.
Figure 4:
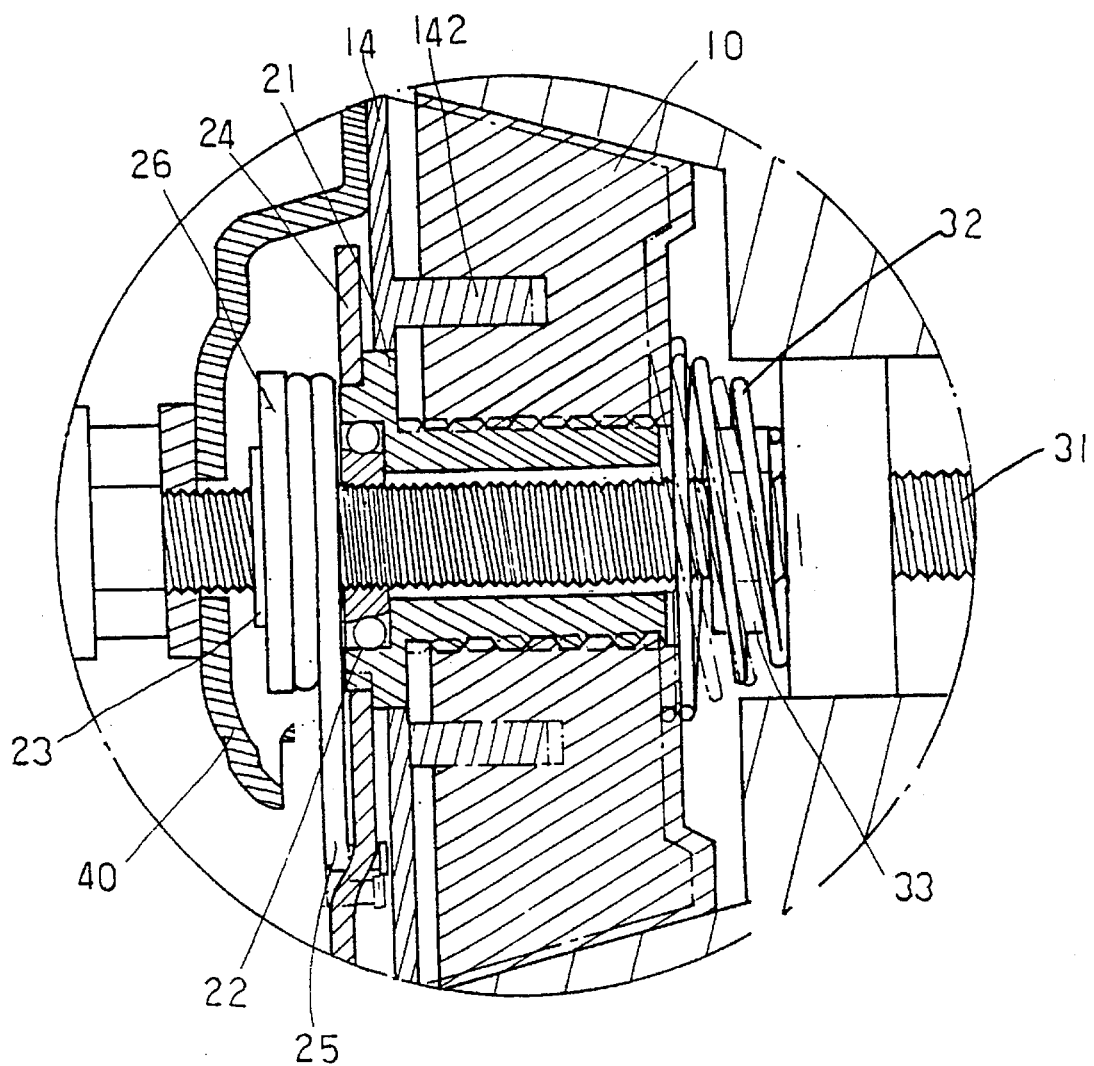
FIG. 4 is an enlarged fragmentary view of FIG. 4.
Figure 5:
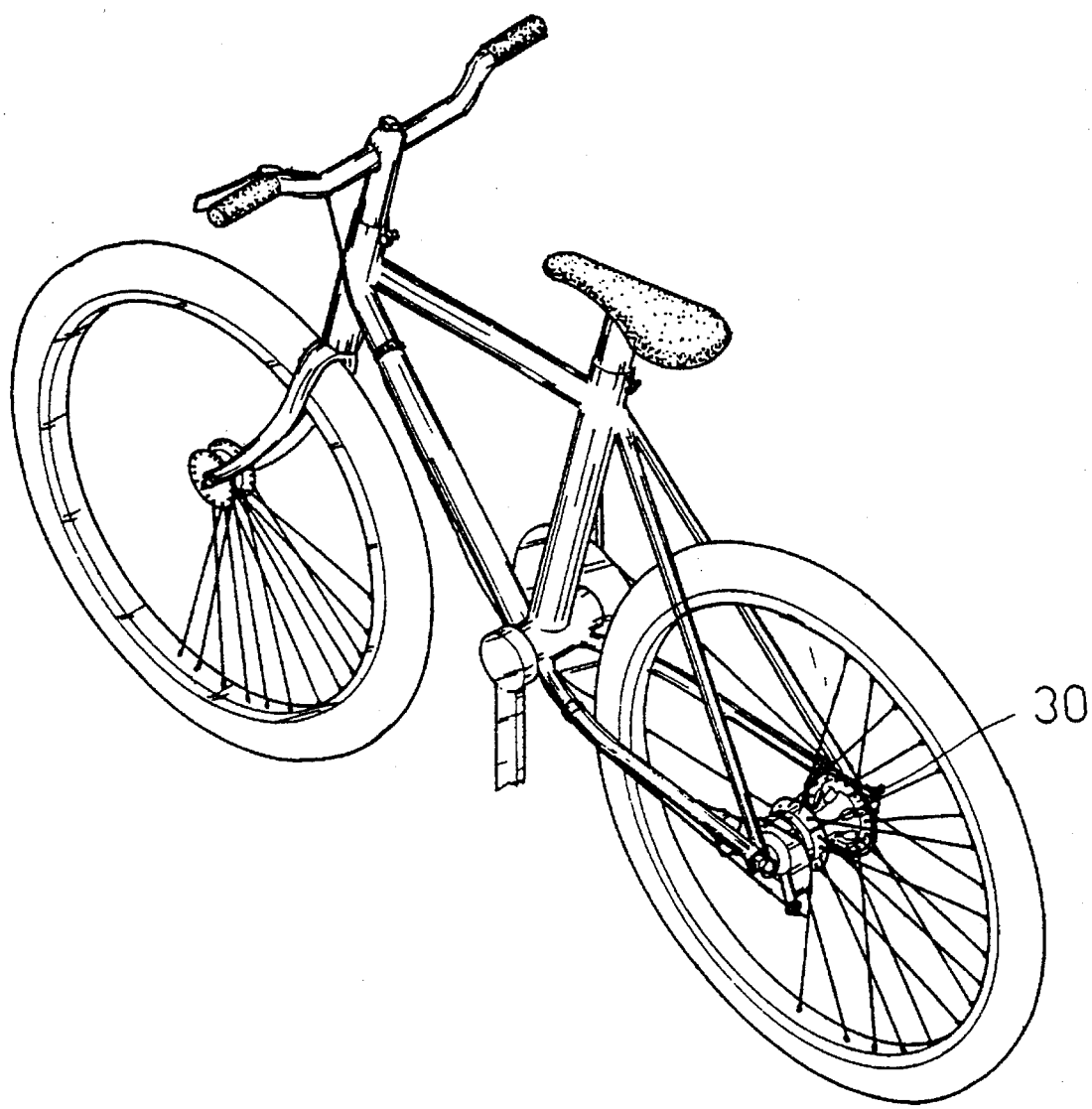
FIG. 5 is a working view of the present invention.
Figure 6:
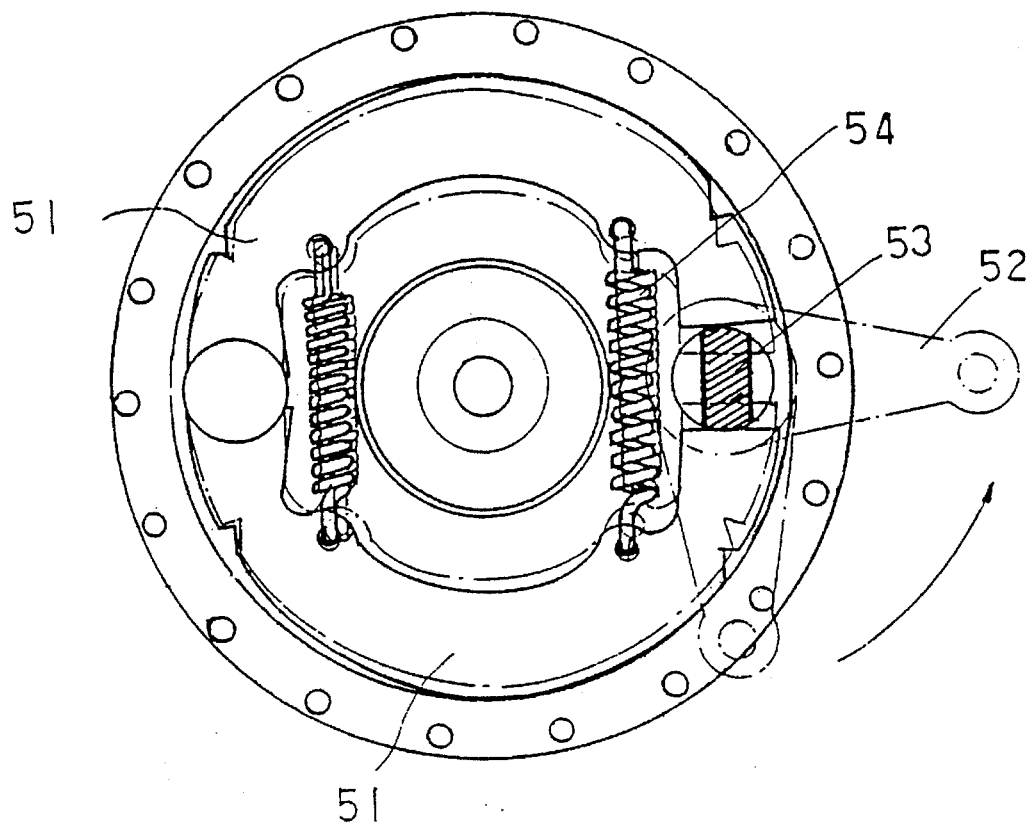
FIG. 6 illustrates the structure of a prior art drum brake for bicycles.

With reference to the drawings and in particular to FIGS. 1, 2 and 5, the hub brake for bicycles according to the present invention mainly comprises a hub 30, a driving means, a braking means, a recovering means, and a cover 40.

The hub 30 is a cylindrical member in which is fitted a screw rod 31 extending therethrough. The hub 30 is formed at an end with a conical recess 301.

The driving means includes a driving screw 21, a bearing 22, an adjusting nut 23 and an arm 24. The driving screw 21 is a tubular member provided with a double-threaded portion 213 at an end and a plurality of notches 2111 at the other end 211. The arm 24, which has an opening 241 at an upper end formed with a plurality of teeth 242 and a hole 243 at a lower end, is connected to the other end 211 of the driving screw 21 with the protuberances 242 engaged with the notches 2111. The hole 243 of the arm 24 is connected with a cable (not shown). The adjusting nut 23 is fitted within the hole 212 of the driving screw 21 and has a longitudinal internal threaded hole 231 and a flange at an intermediate portion. The bearing 22 is fitted over an end of the adjusting nut 23, bearing against the flange 232 of the adjusting nut 23.

The recovering means includes a torsion spring 25 and a helical spring 32. The torsion spring 25 is provided with a hook portion 251 at both ends bearing against the arm 24. A packing ring 26 is mounted on the screw rod 31 for preventing the torsion spring 25 from disengaging therefrom. The helical spring 32 is fitted over the screw rod 31 and disposed within the conical recess 301 of the hub 3. A nut 33 is engaged with the screw rod 31 for preventing the helical spring 32 from detaching from the screw rod 31.

The braking means includes a brake block 10 and a positioning plate 14. The brake block 10 is in the shape of frustum shaped cone adapted to be fitted into the conical recess 301 of the hub 3. The brake block 10 has a longitudinal double-threaded hole 102 engageable with the double-threaded portion 213 of the driving screw 21 and three holes 102 around the double threaded hole 102. The positioning plate 14 is provided with three pins 142 (only two of them are shown in FIG. 1) adapted to fit into the three holes 102 of the brake block 10, an opening 141 for the passage of the screw rod 31, and four holes 143 around the opening 141. Hence, the brake block 10 may move with respect to the positioning plate 14.

The cover 40 is formed with a conical neck 401 at its central portion and a plurality of holes 403 around the the conical neck 401. The cover 40 is fixedly mounted on the positioning plate 14 by screws 60 extending through the cover 40 into the positioning plate 14, with the screw rod 31 going through the center hole 402 of the cover 40.

When applying the brake, the arm 24 will be pulled by the cable (not shown) thereby twisting the torsion spring 25 and rotating the driving screw 21. However, as the driving screw 21 is blocked by the adjusting nut 23 at the left side (see FIGS. 1, 2, 3 and 4), the driving screw 21 will not be moved to the left. In the meantime, the brake block 10 will be forced to go into direct contact with the conical recess 301 of the hub 30 thus reducing speed or the stopping motion of the hub 30. When the brake is released, the torsion spring 25 will recover to its original shape hence moving the arm 24 to its original position and rotating the driving screw 21 in the opposite direction. Then, the brake block 10 will be moved out of the conical recess 301 of the hub 30 and no frictional force will exist therebetween. Once the brake block 10 is worn out, it is only necessary to regulate the adjusting nut 23 to move the brake block 10 slightly toward the conical recess 301 of the hub 30.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A hub brake for bicycles comprising:

a cylindrical hub in which is fitted a screw rod extending therethrough, said hub being formed at an end with a conical recess;

driving means including a driving screw, a bearing, an adjusting nut and an arm, said driving screw being a tubular member provided with a threaded portion at a first end and a plurality of notches at a second end, said arm being formed at an end with an opening having a plurality of internal teeth and at another end with a hole adapted to connect with a cable, said arm being connected to said second end of said driving screw with said teeth engaged with said notches, said adjusting nut being fitted within said hole and having a longitudinal internal threaded hole and a flange at an intermediate portion thereof, said bearing being fitted over an end of said adjusting nut and bearing against said flange;

recovering means including a torsion spring, a helical spring and a nut, said torsion spring being provided with a hook portion at both ends thereof bearing against said arm, said helical spring being fitted over said screw rod and disposed within said conical recess, said nut being engaged with said screw rod to prevent said helical spring from detaching from said screw rod;

braking means including a brake block and a positioning plate, said brake block being slidably mounted within said positioning plate, said brake block being in the shape of a frustum shaped cone adapted to be fitted into said conical recess and having a longitudinal threaded hole engageable with said threaded portion; and a cover fixedly mounted on said positioning plate and having a center hole for passage of said screw rod.

* * * * *